Patented Oct. 20, 1953

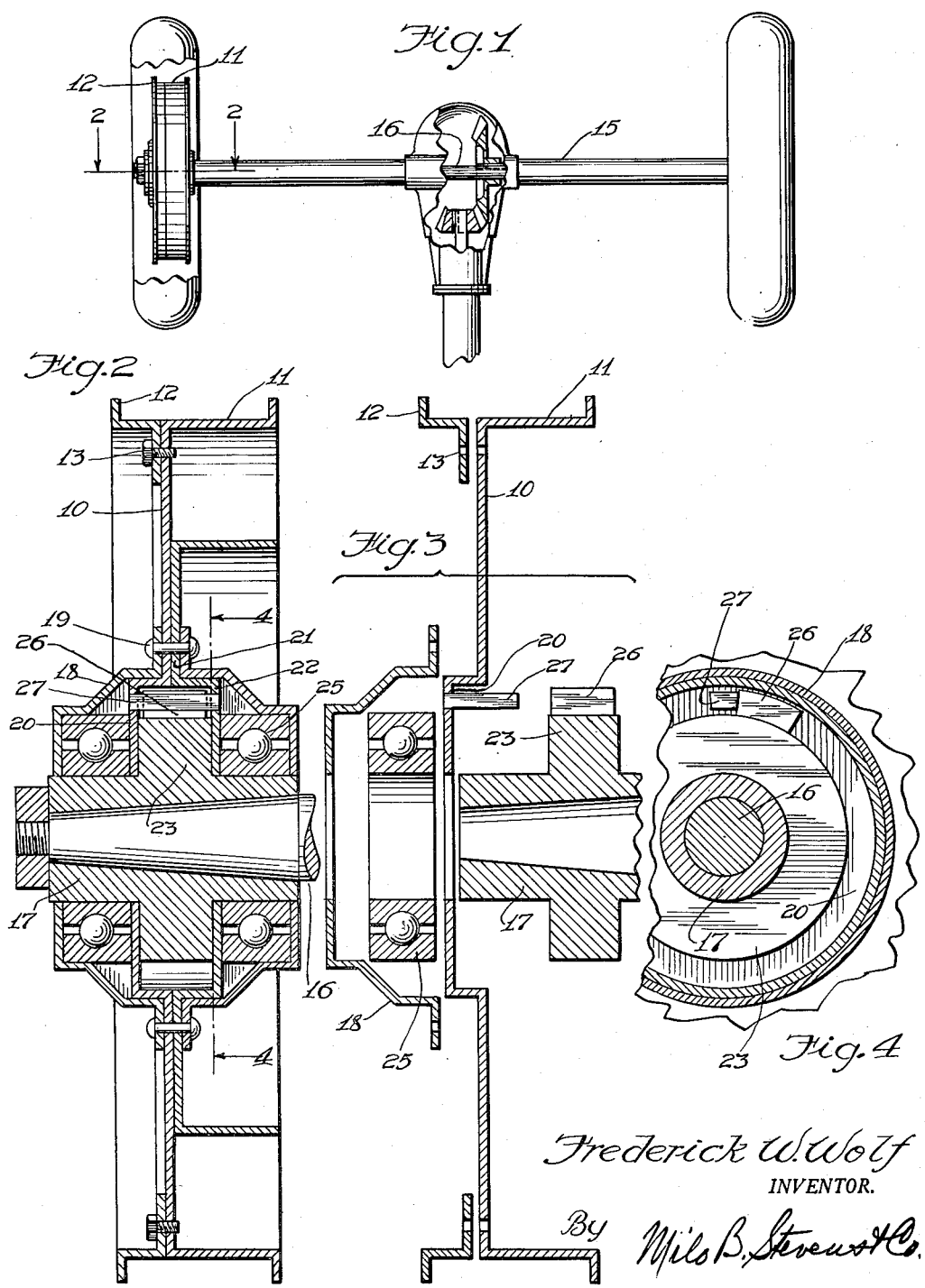

2,656,001

UNITED STATES PATENT OFFICE 2,656,001

TRACTION WHEEL DRIVE FOR AUTOMOBILES

Frederick W. Wolf, Chicago, Ill.

Application February 14, 1951, Serial No. 210,937

4 Claims. (Cl. 180—76)

My invention relates to the traction wheels of automotive vehicles, and more particularly to means for procuring the differential action thereof when rounding curves. Ordinarily, a differential mechanism is employed requiring the use of an axle in two sections, and one of the faults of this arrangement is that slippage of one wheel will absorb the driving power through the differential mechanism without securing the rotation of the other wheel. Also, the cost of a wheel installation involving the conventional differential mechanism is a considerable item in the production of the vehicle. In view of these considerations, it is one object of the present invention to provide an arrangement which dispenses with the conventional differential mechanism, yet secures a positive hold on both wheels in order to drive both under ordinary conditions and at least one in case the other slips on an icy or oily pavement.

A further object is to provide a drive of the above character which employs a single axle shaft from wheel to wheel and completely eliminates a differential mechanism in the medial zone.

Another object is to provide a drive which becomes positive in respect to either wheel as long as such wheel is in tractive engagement with the ground.

An important object is to provide a drive of the above character which is readily adaptable to wheels of conventional design.

An additional object is to provide a drive which is of exceeding simplicity and therefore economical to produce and maintain.

With the above objects in view, and any others which may suggest themselves from the description to follow, a better understanding of the invention may be had by reference to the accompanying drawing, in which—

Fig. 1 is a top plan view of the rear portion of an automotive wheel drive, partly broken away, and incorporating the invention;

Fig. 2 is a magnified section on the line 2—2 of Fig. 1, and showing the wheel assembled;

Fig. 3 is a view similar to Fig. 2, showing some of the components of the wheel separated; and Fig. 4 is a fragmental section taken on the line 4—4 of Fig. 2.

Referring specifically to the drawing, 10 denotes the body of a typical automotive wheel. The same is shown formed with peripheral rim portions 11 and 12 suitable to receive a tire and being secured by a bolt 13. It is of course possible to have a different rim construction for the wheel body 10, since the invention does not reside in the rim zone of the wheel.

The axle of the vehicle is indicated at 15, and the axle shaft at 16. The same receives a hub 17; and the wheel body 10 receives members extending axially to each side of said body to form an annular receptacle 18 surrounding the hub 17, such members being riveted to the body 10 at 19 to become rigidly attached thereto.

Interiorly of the receptacle 18 the wheel body 10 is offset axially to form one wall 20 of an intermediate chamber or enclosure, and a plate 21 is applied to the other side of the body portion 10 prior to riveting the receptacle members and is offset similarly to form a second wall 22. The enclosure formed by the walls 20—22 receives a collar 23 forming a central enlargement of the hub 17; and the receptacle 18 contains ball bearings 25 for the hub 17 at each side thereof.

The collar 23 is extended peripherally with a block 26; and the enclosure 20—22 is spanned by a cross-bar 27 which is in the rotary path of the block 26.

With the hubs 17 made fast on the axle shaft 16, it is apparent that the rotation of the latter from the power unit of the vehicle will bring the block 26 of each wheel hub to bear against the cross-bar 27 thereof as shown in Fig. 4, whereby to positively drive both wheels. Further, when one wheel turns slowly on the inner side of a curve being rounded by the vehicle, the faster rotation of the other wheel on the outer side of the curve will be limited when its block 26 meets the cross-bar 27, so that the outer wheel will slip to a limited extent as both wheels continue on the turn. This circumstance is not of serious consequence when it is considered that most curves negotiated by automotive vehicles are of a quarter-turn extent and rather wide radius, so that the amount of slippage undergone by the outer wheel is limited and even negligible when it is considered that driving is largely in a straight course or with curves which are slight and do not require differential action on the part of the wheels. Further, in case one of the wheels should slip on an icy or oily pavement, the positive drive is still imparted to the other wheel, so that its traction may draw the vehicle out of the difficulty caused by the pavement referred to. Finally, the simplicity of the drive and the single axle shaft procure a great saving over the cost of the conventional differential mechanism and the bearings for the sections of the axle shaft, so that it is possible to produce the novel drive economically as a marked improvement over existing differential drives.

While I have described the invention along specific lines, various minor changes or refinements may be made therein without departing from its principle, and I reserve the right to employ all such changes and refinements as may come within the scope and spirit of the appended claims.

I claim:

1. A drive for a pair of laterally spaced traction wheels comprising a shaft on which the wheels are centered and which is adapted to receive rotation from a power source, a hub carried rigidly by the shaft in the zone of each wheel, the hub having an enlargement intermediate its ends, a projection extending radially from the enlargement, an enclosure carried by the wheel and receiving the enlargement radially part-way, an abutment carried by the enclosure in the space beyond the enlargement in the rotating path of the projection, a receptacle carried by the wheel and formed with companion members encircling the outer end portions of the hub, said receptacle receiving the enclosure in the central portion thereof so as to form spaces between the sides of the receptacle and those of the enclosure, and ball bearings located in such spaces, one component of the ball bearings being carried by the receptacle and the other by the hub.

2. The structure of claim 1, the wheel body being in the form of a plate, and the receptacle members having flanges riveted to the plate.

3. The structure of claim 1, the wheel body being in the form of a plate, a companion plate secured to the wheel plate in doubled relation, and said enclosure being formed by outward offsets of the two plates.

4. A drive for a pair of laterally-spaced traction wheels comprising a shaft on which the wheels are centered and which is adapted to receive rotation from a power source, a hub carried rigidly by the shaft in the zone of each wheel and having an enlargement intermediate its ends, a receptacle carried by the wheel and encircling the hub, an annular enclosure carried by the wheel intermediate the ends of the receptacle and receiving the enlargement radially part-way, a projection extending radially from the enlargement, an aubtment carried inside by the enclosure in the rotating path of the projection, and ball bearings located in the spaces between the sides of the enclosure and those of the receptacle, one component of the ball bearings being carried by the receptacle and the other by the hub for journaling the wheel on the latter.

FREDERICK W. WOLF.

References Cited in the file of this patent

UNITED STATES PATENTS

| Number | Name | Date |
|---|---|---|
| 1,262,049 | Hollis | Apr. 9, 1918 |

FOREIGN PATENTS

| Number | Country | Date |
|---|---|---|
| 88,080 | France | Dec. 7, 1869 |